(Model.)

S. B. ROBBINS.
CUTTER BAR FOR HARVESTERS.

No. 271,127. Patented Jan. 23, 1883.

WITNESSES:
Thos Houghton.
Solon C. Kemon

INVENTOR:
S. B. Robbins
BY
ATTORNEYS.

UNITED STATES PATENT OFFICE.

SYLVAN B. ROBBINS, OF LAWRENCEBURG, INDIANA.

CUTTER-BAR FOR HARVESTERS.

SPECIFICATION forming part of Letters Patent No. 271,127, dated January 23, 1883.

Application filed June 10, 1882. (Model.)

*To all whom it may concern:*

Be it known that I, SYLVAN BALDWIN ROBBINS, of Lawrenceburg, in the county of Dearborn and State of Indiana, have invented a new and useful Improvement in Cutter-Bars for Mowers, Harvesters, &c.; and I do hereby declare that the following is a full, clear, and exact description of the same, reference being had to the accompanying drawings, forming part of this specification.

This invention relates to improvements in cutter-bars for mowers, harvesters, &c., and has for its object to cause the cutting operation to be performed with facility, and the least resistance or strain on the knives or cutters, and at the same time to reduce the power required to operate the latter; secondly, to obtain a joint shear cut and sickle cut, to enable the cutters to act upon the grain or grass to the greatest advantage with relation to cutting it; and, further, to protect the cutters from possible contact with obstacles or substances liable to notch the edges and cause the premature dulling thereof.

To these ends the nature of my invention consists in combining with the knife-edged bar and its fingers a series of rotary cutters, consisting each of a pair of tapering, curved, sharpened hooks or sickles, having shanks made of plates projecting inwardly from the heels of the sickles at a right angle to the tangent of the curve of the sickle-backs, and having rounded outer ends, the said shanks being secured to the end of a common shaft, with the sickles pointing in opposite directions.

It consists, further, of adjusting and holding mechanism for the knife-edged cutter-bar, substantially as hereinafter more full set forth and claimed.

Figure 1:
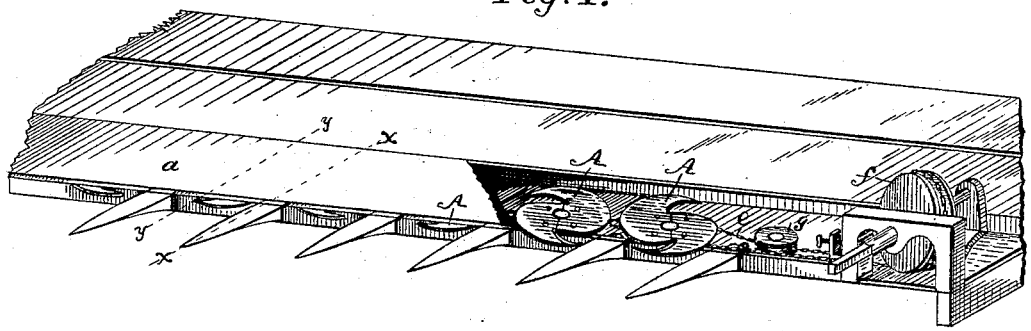
Figure 2:
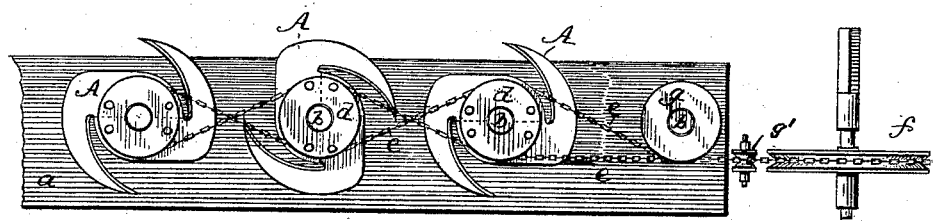
Figure 3:
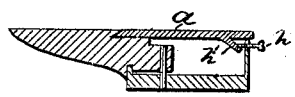
Figure 4:
Figure 5:

In the accompanying drawings, Figure 1 is a perspective view, partly broken away, of a grain or gavel platform of a harvester embodying my improvement, said platform being employed in the present instance simply to show the application of my invention. Fig. 2 is a detail inverted plan view of my improvement. Figs. 3, 4, and 5 are also views in detail thereof.

In carrying out my invention I employ, in connection with the usual finger-bars of a mower or harvester, a platform or support, and the plate $a$, the series of rotary cutters or knives A A. These knives or cutters are individually of a sickle shape—that is to say, each having its cutting part consisting of a tapering, curved, sharpened hook or sickle, while its shank or remaining portion is made of a plate or bar projecting inwardly from the heel of the sickle at a right angle to the tangent of the curve of the sickle-back, and having a rounded outer end. These knives or cutters are arranged in pairs, those of a pair being disposed one on each side of and affixed to a common axis or shaft, $b$, with their shanks or right-angled portions so arranged with relation to each other as to cause the hooked portions to project or point in opposite directions, as seen in Fig. 2. This arrangement of the knives or cutters of a pair forms, as it were, a single knife with two blades or cutting-edges, by which an increase of cutting capacity is obtained. The cutting operation of these knives will be referred to more fully presently. The axes or shafts $b$ of the knives have their bearings in a bar at the front edge of the platform, situated in a relatively parallel plane with the finger-bars, to permit the cutting-edges of the knives or cutters to project and operate between said finger-bars, as seen in Fig. 1. While they are caused to protrude sufficiently beyond the knife-edged bar $a$ to grasp and cut the grain or grass, they are so arranged with relation to the points of the finger-bars as that the possible contact therewith of obstacles or other substance liable to notch the edges and prematurely dull them is prevented. The shafts or axes $b$ of these knives or cutters have pulleys $d$, around which is passed a belt or endless chain, $e$, which is crossed at the intervals between them, to impart to them a rotary motion and to drive each pair or double-bladed knife in an opposite direction. The belt $e$ is passed to and around a vertical drive-pulley, $f$, suitably hung upon a shaft at one end of the platform, said shaft receiving motion from driving-gearing on the mower or harvester.

Intermediately between the pulley $f$ and the cutters next thereto is arranged an idler-pulley, $g$, which changes the plane of the belt to the relatively different planes of the knife or cutter pulleys and the pulley $f$.

$g'$ is a tension-pulley to tighten the belt or chain.

The knife-edged bar $a$ is capable of adjustment with relation to the forward edge of the finger and cutter supporting bar of the platform by means of an adjusting-screw, $h$, bearing in the latter bar and against a projection, $h'$, on the under side of the rear part of the bar $a$, as seen in Fig. 3. The purpose of this is to compensate wear or the grinding away of the bar $a$ in sharpening it. It is readily manipulated by a wrench.

I reserve the privilege of changing the means for driving the rotary cutters, as it is obvious that gearing or even friction-rolls may replace the belt or chain and pulleys.

It will be noticed that from the foregoing the action of the rotary knives or cutters is that of a sickle or draw cut, while the combined action of the cutters and the superposed knife-edged bar is similar to the action of the blades of a pair of shears, thus producing a joint shear cut and sickle or draw cut. The effect of this is, as is apparent, to facilitate the cutting of the grain or grass, to lessen resistance or strain, and to require less power to drive the cutters.

I am aware that it is old to employ a series of rotary cutters, each having blades provided with straight cutting-edges arranged tangentially to their carrying-disk. I lay no claim to such construction, as it does not effect the purposes of my construction of cutter.

I claim and desire to secure by Letters Patent—

1. In a finger-bar for mowers, &c., the combination, with the knife-edged bar $a$, of the series of rotary cutters, A, consisting each of a pair of tapering, curved, sharpened hooks or sickles, having shanks made of plates projecting inwardly from the heels of the sickles at a right angle to the tangent of the curve of the sickle-backs, and having rounded outer ends, the said shanks being secured to the end of a common shaft, with the sickles pointing in opposite directions, as shown and described, and for the purpose set forth.

2. In a finger-bar for mowers, the combination, with the knife-edged bar $a$, with its beveled edge fitted within the undercut rear edges of the fingers, and having an oblique downward-extending projection, $h'$, of the adjusting-screw $h$, substantially as shown, and for the purpose set forth.

SYLVAN B. ROBBINS.

Witnesses:
SOLON C. KEMON,
JOHN T. LAWRENCE.